US010837449B2

(12) United States Patent
Kuno (10) Patent No.: US 10,837,449 B2
(45) Date of Patent: Nov. 17, 2020

(54) VACUUM PUMP (71) Applicant: SHIMADZU CORPORATION, Kyoto (JP)

(72) Inventor: Satoshi Kuno, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 207 days.

(21) Appl. No.: 15/937,788

(22) Filed: Mar. 27, 2018

(65) Prior Publication Data
US 2018/0283386 A1 Oct. 4, 2018

(30) Foreign Application Priority Data

Apr. 3, 2017 (JP) ................................. 2017-073823

(51) Int. Cl.
F04D 19/04 (2006.01)
F04D 29/64 (2006.01)
(Continued)

(52) U.S. Cl.
CPC ......... F04D 19/042 (2013.01); F04D 19/044 (2013.01); F04D 19/048 (2013.01);
(Continued)

(58) Field of Classification Search
CPC .... F04D 19/042; F04D 19/044; F04D 19/048; F04D 29/083; F04D 29/522;
(Continued)

(56) References Cited

U.S. PATENT DOCUMENTS 2,213,630 A * 9/1940 Gade ...................... B21K 1/463
411/396
8,459,931 B2 * 6/2013 Onishi .................. F04D 19/042
415/199.5
(Continued)

FOREIGN PATENT DOCUMENTS

CN 2621252 6/2004
CN 204805119 11/2015
(Continued)

OTHER PUBLICATIONS

McMaster-Carr Catalog 114; 200 New Canton Way Robbinsville, NJ 08691-2343 Published 2008 pp. 3057 & 3068 (Year: 2008).*
(Continued)

Primary Examiner — Patrick Hamo
Assistant Examiner — Joseph S. Herrmann
(74) Attorney, Agent, or Firm — Renner, Otto, Boisselle & Sklar, LLP (57) ABSTRACT A vacuum pump comprises: a base; a rotor shaft rotatably provided at the base; a rotor including rotor blades arranged in multiple stages and a rotor cylindrical portion, and attached to the rotor shaft; stationary blades each arranged between adjacent ones of the rotor blades, the stationary blades and the rotor blades forming a turbo exhaust portion; a stator forming, together with the rotor cylindrical portion, a screw groove exhaust portion; and a hexagon socket head cap screw configured to fix the stator to an upper surface of the base in a guiding path of the screw groove exhaust portion to which gas is guided from the turbo exhaust portion. The hexagon socket head cap screw is a bolt having a smaller height of a head portion than that of a hexagon socket head cap screw according to a provision of a country of use or an international organization.

1 Claim, 10 Drawing Sheets (51) Int. Cl.
*F04D 29/08* (2006.01)
*F16C 32/04* (2006.01)
(52) U.S. Cl.
CPC .......... *F04D 29/644* (2013.01); *F04D 29/083* (2013.01); *F16C 32/0442* (2013.01); *F16C 2360/45* (2013.01)
(58) Field of Classification Search
CPC ...... F04D 29/644; F15B 35/06; F15B 35/065; F15B 35/048; F16C 2360/45; F16C 32/0442; F16C 32/444
USPC .......................................... 411/148, 303, 399
See application file for complete search history.

(56) References Cited

U.S. PATENT DOCUMENTS

| | | | | |
|---|---|---|---|---|
| 8,562,266 | B2* | 10/2013 | Sexton | F16B 35/042 411/403 |
| 8,961,105 | B2* | 2/2015 | Kogame | F04D 19/042 415/213.1 |
| 9,157,443 | B2* | 10/2015 | Tsutsui | F04D 19/042 |
| 9,470,235 | B2* | 10/2016 | Sumimoto | F04D 29/544 |
| 9,976,572 | B2* | 5/2018 | Kogame | F04D 29/701 |
| 10,132,329 | B2* | 11/2018 | Tsubokawa | F04D 29/522 |

FOREIGN PATENT DOCUMENTS

| | | |
|---|---|---|
| CN | 106246563 A | 12/2016 |
| JP | 2015-031151 | 2/2015 |
| JP | 2016-017454 | 2/2016 |
| JP | 2017002856 A | 1/2017 |
| JP | 6414401 B2 * | 10/2018 |

OTHER PUBLICATIONS

Office Action for corresponding Chinese Application No. 2018102019072 dated Jun. 11, 2020, with English translation.
Office Action for corresponding Japanese Application No. 2017-073823 dated Jul. 2, 2020, with English translation.

* cited by examiner

VACUUM PUMP

BACKGROUND OF THE INVENTION

1. Technical Field

The present invention relates to a vacuum pump.

2. Background Art

Typically, a vacuum pump has been known, which includes a turbo exhaust portion having rotor blades and stationary blades, and a screw groove exhaust portion having a screw stator to which gas is guided from the turbo exhaust portion.

The screw stator is attached to a base with headed bolts for fixing. A head portion of each headed bolt protrudes from an upper portion of the screw groove exhaust portion to which the gas is guided from the turbo exhaust portion, i.e., an upper surface of the screw stator (see, e.g., FIG. 1 of Patent Literature 1 (JP-A-2015-31151)).

At an inlet of the screw groove exhaust portion to which the gas is guided from the turbo exhaust portion, the head portion of each headed bolt protrudes from the upper surface of the screw stator. For this reason, a product is accumulated on aside surface of the head portion of each headed bolt facing a pump rotation direction. That is, the head portion of each headed bolt protruding from the upper surface of the screw stator provides resistance to a gas flow.

SUMMARY OF THE INVENTION

A vacuum pump comprises: a base; a rotor shaft rotatably provided at the base; a rotor including rotor blades arranged in multiple stages and a rotor cylindrical portion, and attached to the rotor shaft; stationary blades each arranged between adjacent ones of the rotor blades, the stationary blades and the rotor blades forming a turbo exhaust portion; a stator forming, together with the rotor cylindrical portion, a screw groove exhaust portion; and a hexagon socket head cap screw configured to fix the stator to an upper surface of the base in a guiding path of the screw groove exhaust portion to which gas is guided from the turbo exhaust portion. The hexagon socket head cap screw is a bolt having a smaller height of a head portion than that of a hexagon socket head cap screw according to a provision of a country of use or an international organization.

A depth of a hexagon hole provided at the head portion of the hexagon socket head cap screw is according to a provision of a country of use or an international organization.

The upper surface of the stator has a region with an inclined surface with a downward slope toward the rotor shaft, and the upper surface of the stator on which the hexagon socket head cap screw is arranged is a flat surface.

A counterbore is provided at an upper surface of the stator, and at least part of a head portion of the hexagon socket head cap screw is arranged in the counterbore.

An entirety of the head portion of the hexagon socket head cap screw is arranged in the counterbore.

An upper surface of the head portion of the hexagon socket head cap screw becomes substantially flush with an upper surface of the stator.

A vacuum pump comprises: a base; a rotor shaft rotatably provided at the base; a rotor including rotor blades arranged in multiple stages and a rotor cylindrical portion, and attached to the rotor shaft; stationary blades each arranged between adjacent ones of the rotor blades, the stationary blades and the rotor blades forming a turbo exhaust portion; a stator forming, together with the rotor cylindrical portion, a screw groove exhaust portion; and a hexagon socket head cap screw configured to fix the stator to an upper surface of the base in a guiding path of the screw groove exhaust portion to which gas is guided from the turbo exhaust portion. A counterbore is provided at an upper surface of the stator, and at least part of a head portion of the hexagon socket head cap screw is arranged in the counterbore.

An entirety of the head portion of the hexagon socket head cap screw is arranged in the counterbore.

An upper surface of the head portion of the hexagon socket head cap screw becomes substantially flush with an upper surface of the stator.

A depth of a hexagon hole provided at the head portion of the hexagon socket head cap screw is according to a provision of a country of use or an international organization.

The upper surface of the stator has a region with an inclined surface with a downward slope toward the rotor shaft, and the upper surface of the stator on which the hexagon socket head cap screw is arranged is a flat surface.

According to the present invention, the resistance against the gas flow at the inlet of the screw groove exhaust portion can be reduced.

DETAILED DESCRIPTION OF THE EXEMPLARY EMBODIMENTS

First Embodiment

Figure 1:
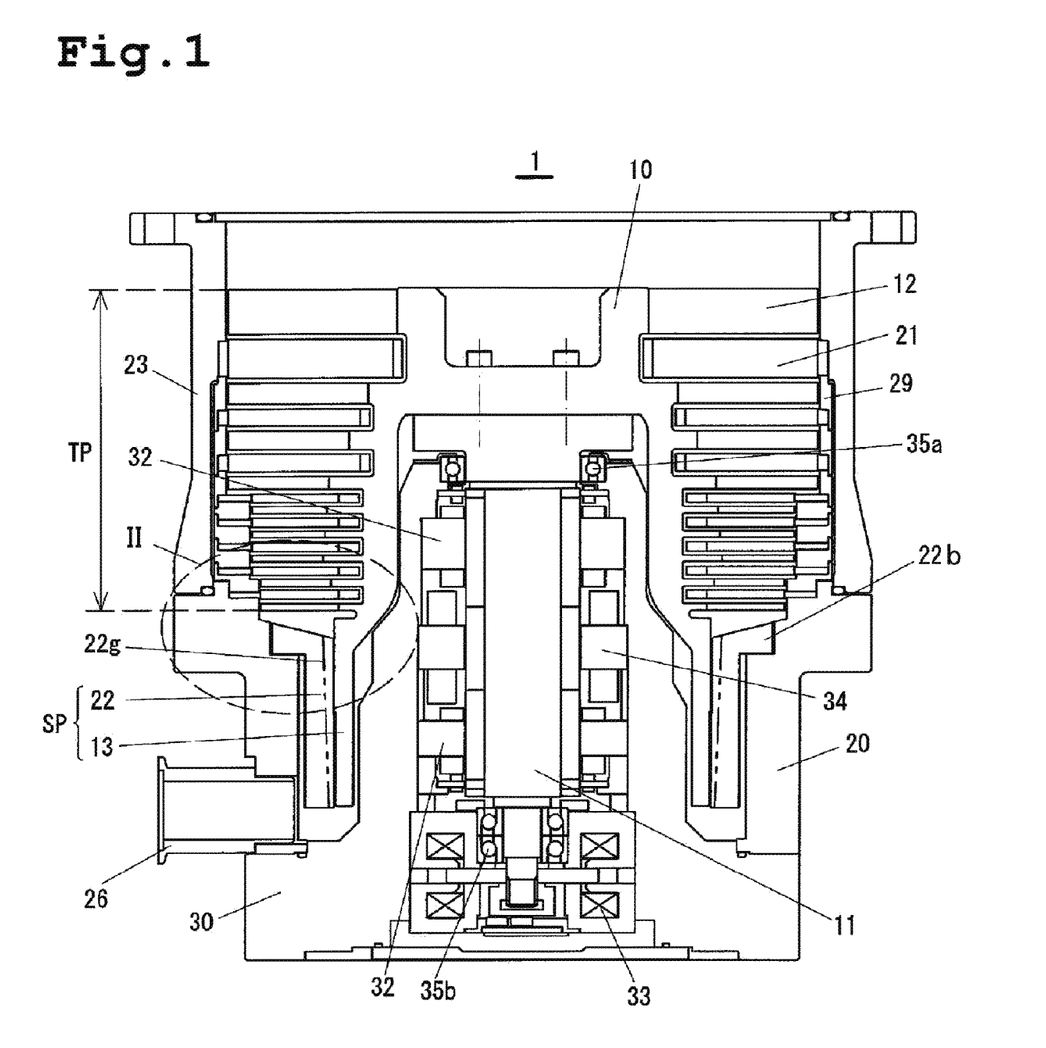
FIG. 1 is a sectional view of a first embodiment describing a turbo-molecular pump as an example of a vacuum pump of the present invention.

Hereinafter, a first embodiment of the present invention will be described with reference to FIGS. 1 to 4. FIG. 1 is a sectional view of the first embodiment describing a turbo-molecular pump as an example of a vacuum pump of the present invention. The turbo-molecular pump illustrated in FIG. 1 is a magnetic levitation turbo-molecular pump, but the present invention is not limited to the magnetic levitation turbo-molecular pump.

A turbo-molecular pump 1 includes a rotor 10 provided with multiple rotor blades 12 and a rotor cylindrical portion 13. In a pump case 23, multiple stationary blades 21 are, in the stack, arranged corresponding to the multiple rotor blades 12. The multiple stationary blades 21 stacked in a rotor axis direction are each arranged on a base 20 through spacers 29. Each rotor blade 12 has multiple turbine blades. Each stationary blade 21 includes a pair of halved stationary blade elements. The multiple rotor blades 12 and the multiple stationary blades 21 form a turbo exhaust portion TP.

A cylindrical screw stator 22 is arranged with a slight spacing on an outer peripheral side of the rotor cylindrical portion 13. The screw stator 22 is, at a flange 22b thereof, fixed to the base 20 with fixing bolts 40 (see FIG. 2 etc.). The structure of fixing the screw stator 22 to the base 20 will be described later. A screw groove 22g is formed at any of an outer peripheral surface of the rotor cylindrical portion 13 and an inner peripheral surface of the screw stator 22, and the rotor cylindrical portion 13 and the screw stator 22 form a screw groove exhaust portion SP. In the example illustrated in FIG. 1, the screw groove 22g is formed at the screw stator 22. Gas exhausted by the turbo exhaust portion TP is further compressed by the screw groove exhaust portion SP, and eventually, is exhausted by a back pump connected to an exhaust pipe 26 of the base 20.

The rotor 10 is fixed to a rotor shaft 11. The rotor shaft 11 is supported by a radial magnetic bearing 32 and an axial magnetic bearing 33, and is rotatably driven by a motor 34. When the radial and axial magnetic bearings 32, 33 are not in operation, the rotor shaft 11 is supported by mechanical bearings 35a, 35b. The radial magnetic bearing 32, the axial magnetic bearing 33, the motor 34, and the mechanical bearing 35b are housed in a housing 30 fixed to the base 20.

Figure 2:
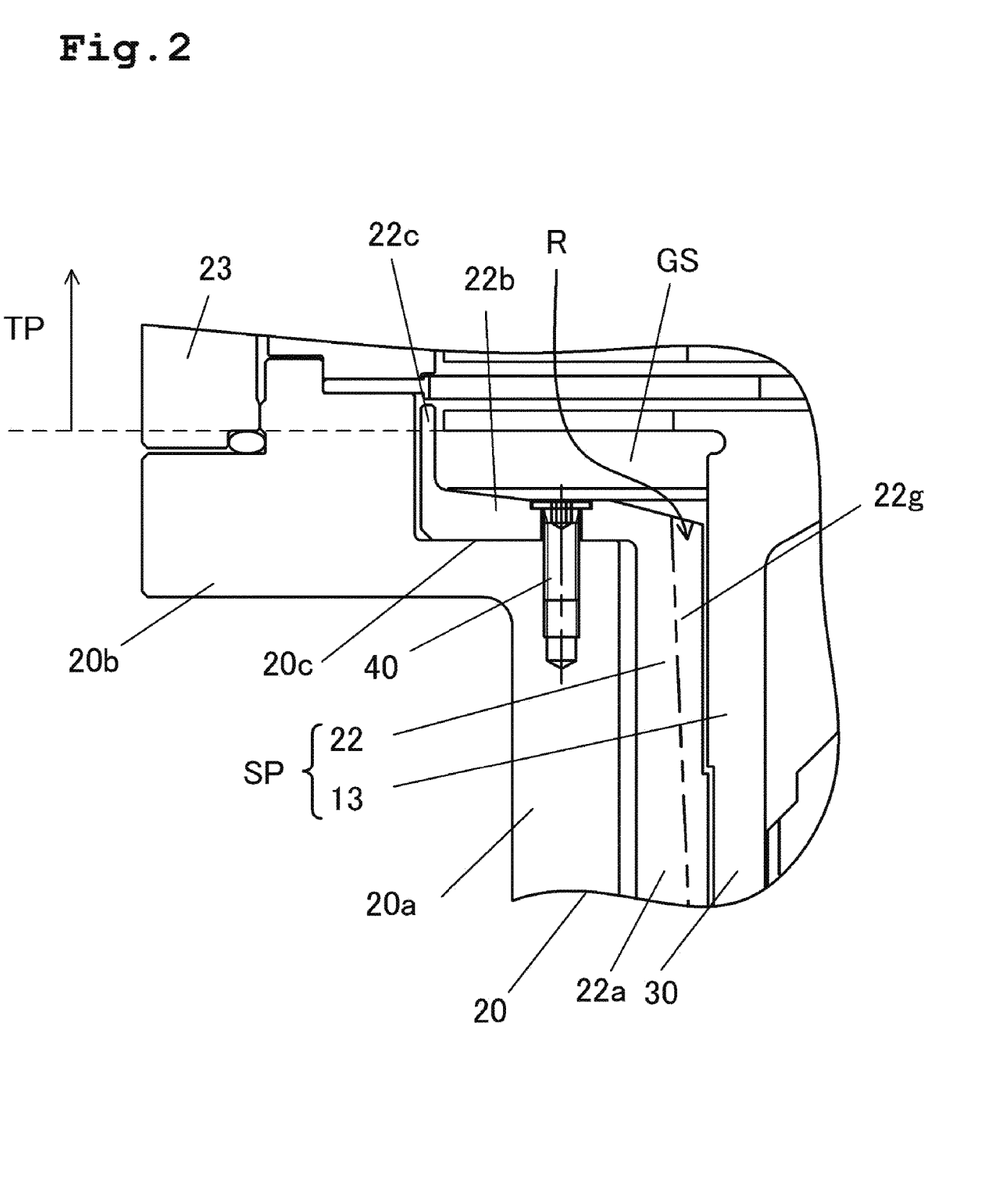
FIG. 2 is an enlarged view of a region indicated by a dashed line II of FIG. 1.
Figure 3:
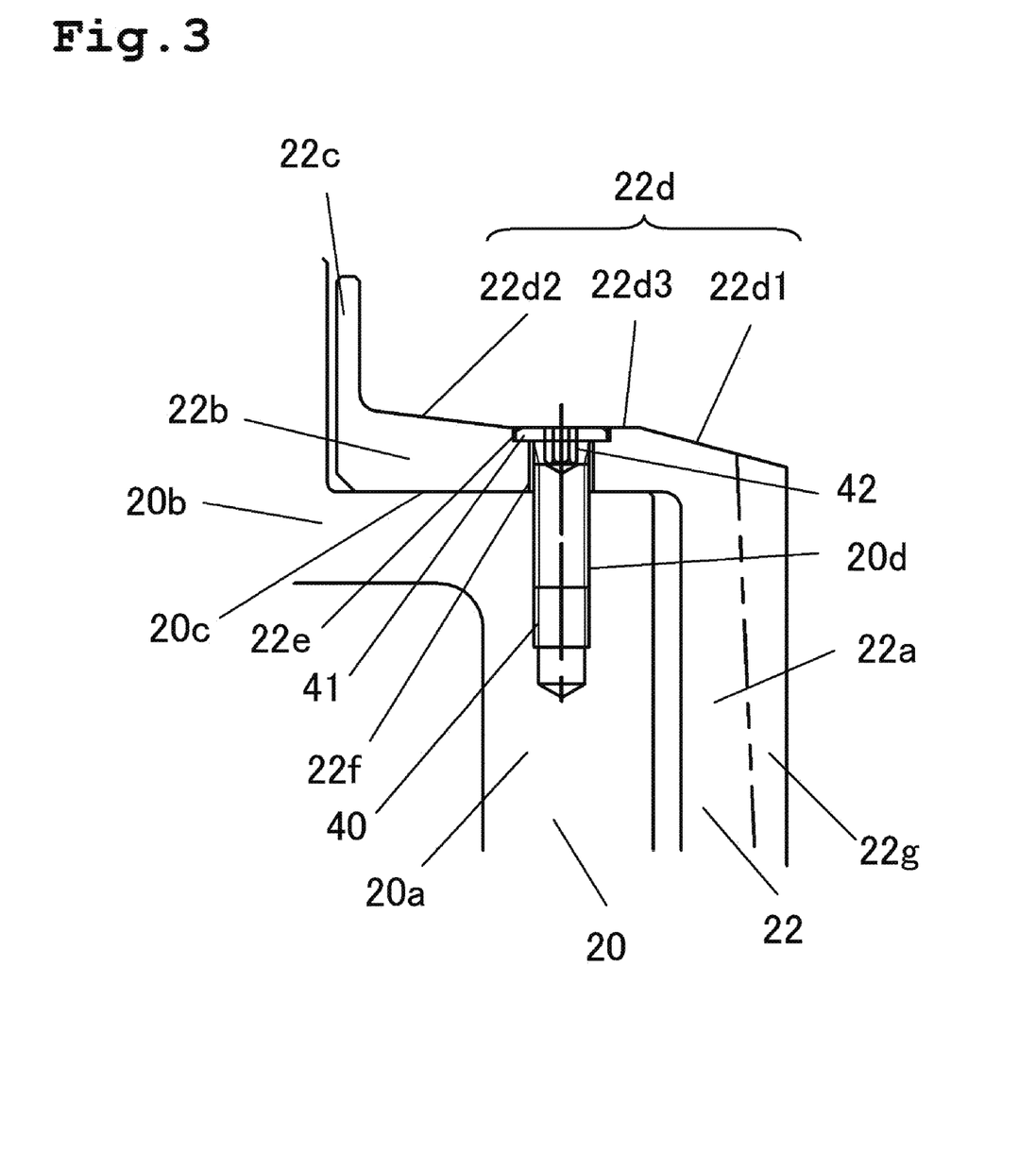
FIG. 3 is an enlarged view of a screw stator fixing region of FIG. 2.
Figure 4:
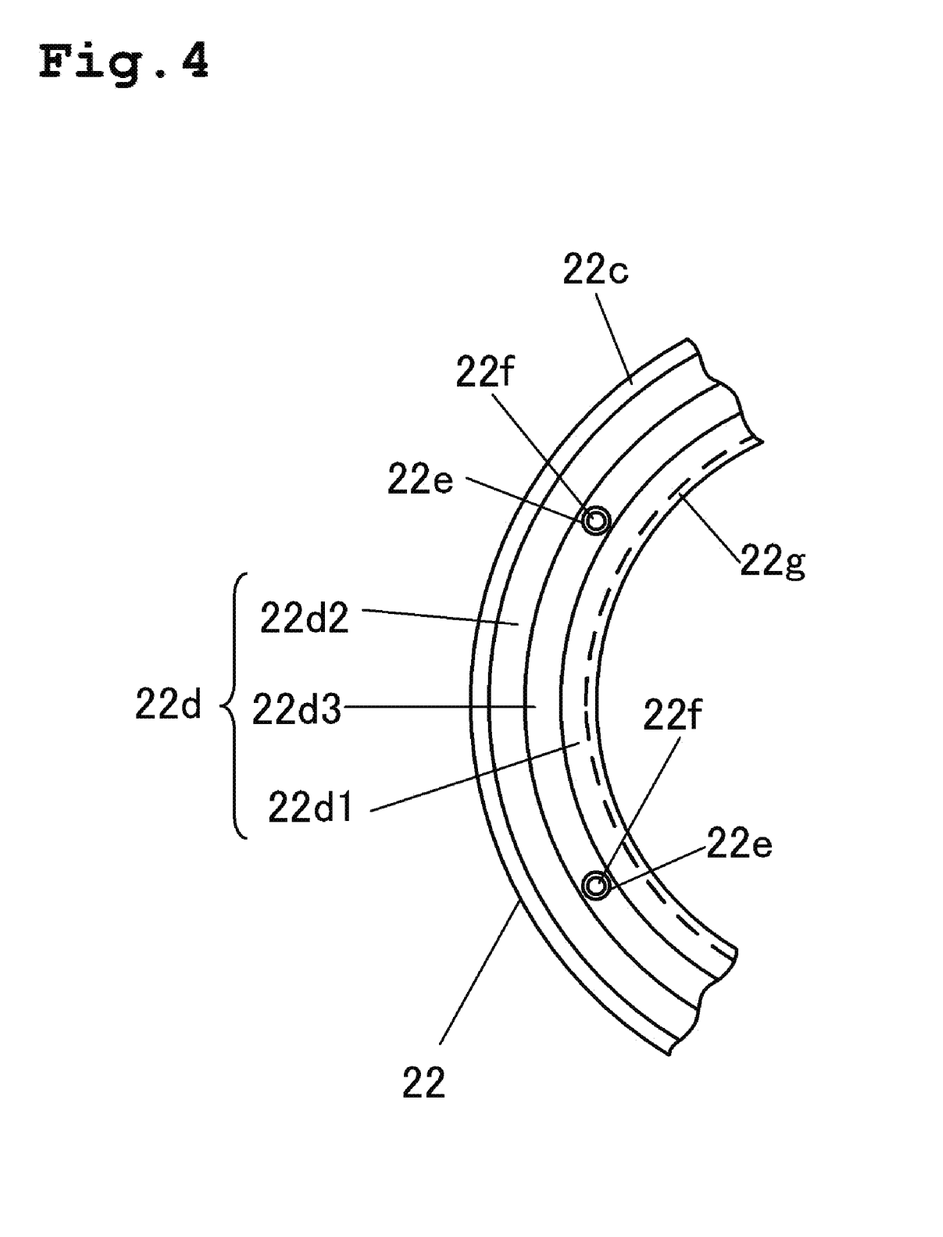
FIG. 4 is a partial plan view of a screw stator from a turbo exhaust portion side.

FIG. 2 is an enlarged view of a region indicated by a dashed line II of FIG. 1, FIG. 3 is an enlarged view of a screw stator fixing region of FIG. 2, and FIG. 4 is a partial plan view of the screw stator from a turbo exhaust portion side.

A curved arrow R illustrated in FIG. 2 indicates an image of the flow of exhausted gas . Gas exhausted by the turbo exhaust portion TP enters a flow path GS formed between the turbo exhaust portion TP and the screw groove exhaust portion SP, and further flows into the screw groove 22g from the flow path GS. That is, the flow path GS is a guiding path of the screw groove exhaust portion SP through which the gas exhausted from the turbo exhaust portion TP is guided into the screw groove 22g.

The screw stator 22 has a cylindrical portion 22a and the flange 22b provided on the turbo exhaust portion TP side as an upper side of the cylindrical portion 22a. At an outer peripheral edge portion of the flange 22b, an outer peripheral portion 22c is formed to protrude from the flange 22b to the turbo exhaust portion side. The cylindrical portion 22a, the flange 22b, and the outer peripheral portion 22c are integrally molded from the same material.

The base 20 has a cylindrical main body portion 20a and a flange portion 20b provided on the turbo exhaust portion TP side as an upper side of the main body portion 20a. The main body portion 20a and the flange portion 20b are integrally molded from the same material. An outer peripheral side of the flange portion 20b is formed thick, and the pump case 23 is fixed to an upper surface of such a thick portion. The pump case 23 and the flange portion 20b of the base 20 are fixed together through a seal member, and are sealed from the outside. A placement portion for placement of the screw stator 22 is provided recessed on an inner peripheral side of the thick portion of the flange portion 20b of the base 20. An upper surface 20c of such a placement portion is a flat surface. A lower surface of the flange 22b of the screw stator 22 is, with the fixing bolts 40, fixed onto the upper surface 20c of the placement portion provided at the flange portion 20b of the base 20.

As illustrated in FIGS. 3 and 4, an inner peripheral side inwardly-inclined surface 22d1, an inner peripheral side outwardly-inclined surface 22d2, and a flat surface 22d3 arranged between the inner peripheral side inwardly-inclined surface 22d1 and the inner peripheral side outwardly-inclined surface 22d2 are formed at an upper surface 22d of the flange 22b of the screw stator 22. The inner peripheral side inwardly-inclined surface 22d1 and the inner peripheral side outwardly-inclined surface 22d2 are formed with a downward slope toward a rotor shaft 11 side. A slope angle may be different or the same between these surfaces. The flat surface 22d3 is annularly formed in a direction perpendicular to the rotor shaft 11, i.e., the substantially horizontal direction. Note that the inner peripheral side inwardly-inclined surface 22d1 and the inner peripheral side outwardly-inclined surface 22d2 are not limited to those inclined linearly, but may be formed in a curved shape.

Reasons for forming the inner peripheral side inwardly-inclined surface 22d1 and the inner peripheral side outwardly-inclined surface 22d2 at the flange 22b of the screw stator 22 will be described below.

The inner pressure of the flow path GS may lead to any of a molecular flow, a viscous flow, and an intermediate flow therebetween. It is assumed that in a molecular flow region, collision among gas molecules and a wall surface is more dominant than collision among gas molecules and scattering direction distribution of the gas molecules collided with the wall surface depends on the law of cosines. Some of gas molecules having flowed into the flow path GS from the turbo exhaust portion TP directly enter the screw groove 22g. However, most of the remaining gas molecules enter toward an outer surface of members surrounding the flow path GS, and are scattered based on the law of cosines. When the upper surface 22d of the screw stator 22 extends horizontally, there is a higher probability that the gas molecules having flowed into the flow path GS enter toward the upper surface 22d of the screw stator 22 and the lowermost rotor blade 12 and are scattered in a direction parallel to an axial direction of the rotor shaft 11, and therefore, flow back in the flow path GS. For this reason, it takes time to guide the gas molecules, which have flowed into the flow path GS, into the screw groove 22g. On the other hand, in the first embodiment, the inner peripheral side inwardly-inclined surface 22d1 and the inner peripheral side outwardly-inclined surface 22d2 with the downward slope toward the rotor shaft 11 side are formed at the upper surface 22d of the flange 22b of the screw stator 22. Thus, the probability that the gas molecules having entered toward the upper surface 22d of the flange 22b of the screw stator 22 are scattered toward the rotor shaft side is increased. Thus, the gas molecules having flowed into the flow path GS are promptly guided into the screw groove 22g. In the case of the viscous flow, collision among gas molecules is more dominant. With inclination, the gas molecules can be promptly guided into the screw groove 22g without delay. Thus, product accumulation in the flow path GS can be reduced.

Multiple counterbores 22e are formed apart from each other in a circumferential direction at the flat surface 22d3. A through-hole 22f penetrating the flange 22b in a thickness direction thereof is formed at a bottom surface of each counterbore 22e. The center of the through-hole 22f is coaxial with the center of the counterbore 22e. Internal thread portions 20d are formed at the main body portion 20a of the base 20. The screw stator 22 and the rotor cylindrical portion 13 are coaxially arranged to precisely set the passage dimensions of the screw groove exhaust portion SP.

Each fixing bolt 40 is a hexagon socket head cap screw configured such that a hexagon hole 42 is formed at a head portion 41. The hexagon socket head cap screw is a hexagon socket head cap screw (a standardized product) according to the provisions of JIS B 1176 or a hexagon socket head cap screw having a smaller height (a smaller thickness) of a head portion 41 than that of the standardized product. The height of the head portion 41 of the hexagon socket head cap screw is the substantially same as the depth of the counterbore 22e. Note that in the case of using, as the fixing bolt 40, a bolt having a smaller height of a head portion 41 than that according to the provisions of JIS B 1176, the dimensions of some portions may be different from those according to the provisions of JIS B 1176. Note that in this case, the depth of the hexagon hole 42 is preferably according to the provisions of JIS B 1176 for ensuring clamping force of the fixing bolt 40.

For fixing the screw stator 22 to the base 20, the through-hole 22f of the screw stator 22 is position-adjusted to the internal thread portion 20d of the base 20, and then, the fixing bolt 40 is fastened to the internal thread portion 20d of the base 20. Thus, the head portion 41 of the fixing bolt 40 enters the counterbore 22e of the screw stator 22 to press the bottom surface of the counterbore 22e. In this manner, the screw stator 22 is fixed to the base 20. The bottom surface of the counterbore 22e formed at the flange 22b of the screw stator 22 is parallel to the flat surface 22d3 of the flange 22b, and the depth of the counterbore 22e is the substantially same as the height of the head portion 41 of the fixing bolt 40. Thus, in a state in which the head portion 41 of the fixing bolt 40 presses the bottom surface of the counterbore 22e of the screw stator 22, an upper surface of the head portion 41 of the fixing bolt 40 is substantially flush with an upper surface of the flat surface 22d3 of the screw stator 22.

When gas exhausted from the turbo exhaust portion TP enters the flow path GS and subsequently flows into the screw groove 22g from the flow path GS, the gas passes over the head portion 41 of the fixing bolt 40. In a typical structure in which a head portion 41 of a fixing bolt 40 protrudes from an upper surface 22d of a screw stator 22, the head portion 41 of the fixing bolt 40 interferes with the flow of gas exhausted from a turbo exhaust portion TP and flowing in a flow path GS. On the other hand, the first embodiment has such a structure that the head portion 41 of the fixing bolt 40 does not protrude from the upper surface 22d of the screw stator 22. Thus, the head portion 41 of the fixing bolt 40 does not interfere with the flow of gas in the flow path GS.

Moreover, in the typical structure in which the head portion 41 of the fixing bolt 40 protrudes from the upper surface 22d of the screw stator 22, a product is accumulated on an outer peripheral surface of the head portion 41 of the fixing bolt 40, i.e., a side surface of the head portion 41 of the fixing bolt 40 facing a pump rotation direction. Such product accumulation further interferes with the flow of gas flowing from the turbo exhaust portion TP and flowing in the flow path GS. On the other hand, the first embodiment has such a structure that the head portion 41 of the fixing bolt 40 does not protrude from the upper surface 22d of the screw stator 22. Thus, no product is accumulated on an outer peripheral surface of the head portion 41 of the fixing bolt 40. Thus, according to the first embodiment, exhaust performance of the turbo-molecular pump 1 can be improved. Moreover, no product is accumulated on the outer peripheral surface of the head portion 41 of the fixing bolt 40, and therefore, operation and maintenance are facilitated without the need for a product removal process.

According to the first embodiment, the following advantageous effects are provided.

(1) In the structure in which the screw stator 22 is fixed to the upper surface 20c of the base 20 with the hexagon socket head cap screws in the guiding path of the screw groove exhaust portion SP into which gas is guided from the turbo exhaust portion TP, the counterbores 22e are provided at the upper surface 22d of the screw stator 22 to which the gas is guided from the turbo exhaust portion TP, and the upper surface of the head portion 41 of each hexagon socket head cap screw becomes substantially flush with the upper surface 22d of the screw stator 22. Thus, a clearance between the upper surface 22d of the screw stator 22 and the lowermost rotor blade 12 is not narrowed by a portion of the head portion 41 of each fixing bolt 40, and therefore, the head portion 41 of each fixing bolt 40 does not interfere with the flow of gas in the flow path GS. Moreover, no product is accumulated on the outer peripheral surface of the head portion 41 of each fixing bolt 40. Since no product is accumulated on the outer peripheral surface of the head portion 41 of each fixing bolt 40, operation and maintenance are facilitated without the need for the product removal process.

(2) The following structure is employed: even in a case where a fixing bolt 40 having a smaller height of a head portion 41 than that of the standardized product is used as the fixing bolt 40 for fixing the screw stator 22 to the base 20, the hexagon socket head cap screw configured such that the depth of the hexagon hole 42 of the fixing bolt 40 is according to the provisions of JIS B 1176 is used. Thus, when the hexagon socket head cap screw are fastened by a tool, a contact surface area between the tool and the hexagon hole 42 of the hexagon socket head cap screw is the same as that of the standardized product. This provides the effect of fastening the hexagon socket head cap screw with sufficient clamping force without damage at the surface contacting the tool.

(3) The upper surface 22d of the screw stator 22 has the inner peripheral side inwardly-inclined surface 22d1 and the inner peripheral side outwardly-inclined surface 22d2 with the downward slope toward the rotor shaft 11. This increases the probability that gas molecules having entered toward the upper surface 22d of the screw stator 22 are scattered toward the rotor shaft 11 side, and the gas molecules having flowed into the flow path GS are promptly guided into the screw groove 22g. Thus, product accumulation in the flow path GS can be reduced.

First Variation of First Embodiment

Figure 5:
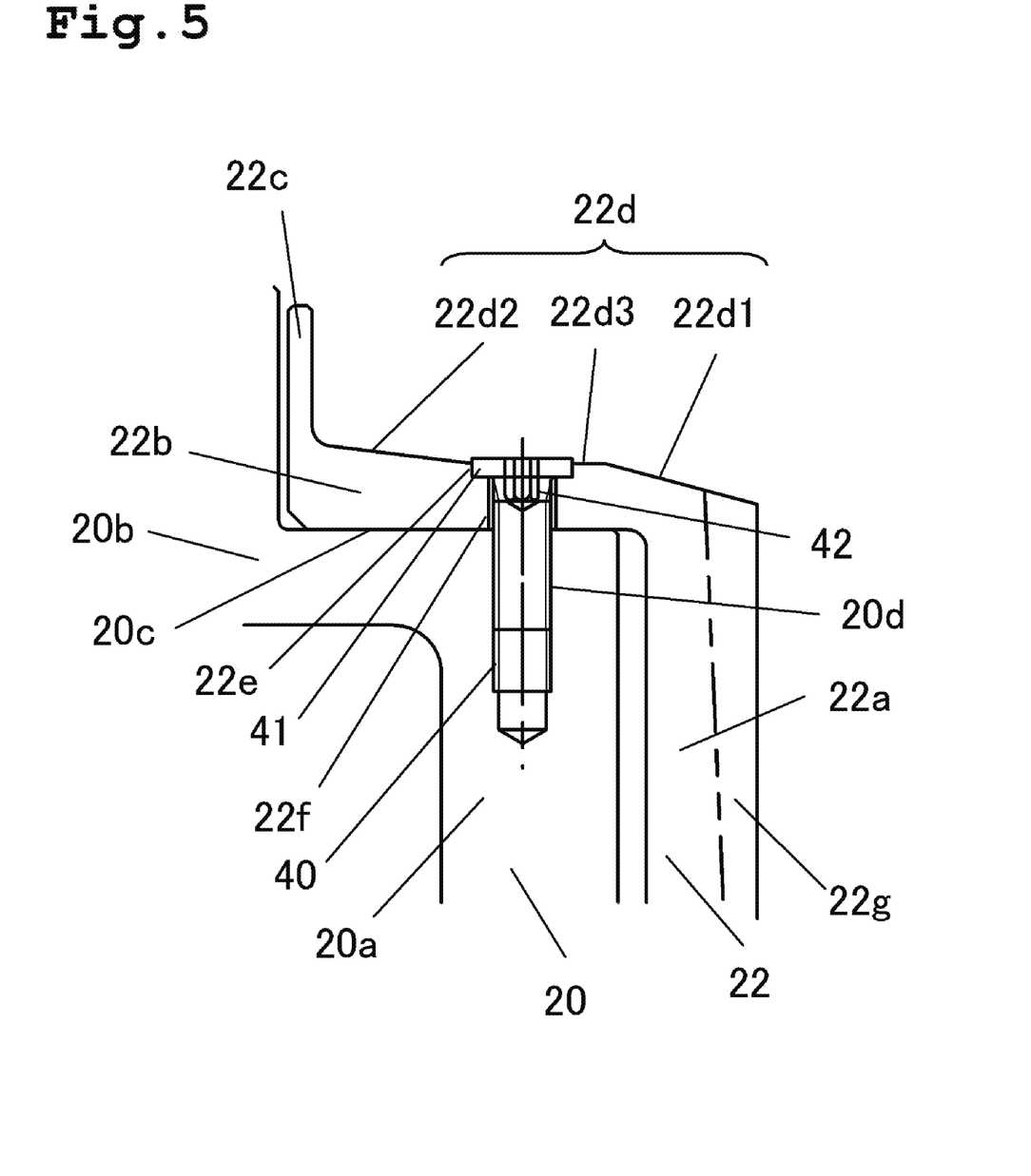
FIG. 5 is a view of a first variation of the first embodiment.

FIG. 5 is a view of a first variation of the first embodiment, FIG. 5 corresponding to FIG. 3.

The first variation illustrated in FIG. 5 has such a structure that an upper portion of the head portion 41 of the hexagon socket head cap screw arranged in the counterbore 22e protrudes from the flat surface 22d3 of the screw stator 22. That is, in this structure, the height (the thickness) of the head portion 41 of the hexagon socket head cap screw is formed greater than the depth of the counterbore 22e provided at the screw stator 22. The height of the head portion 41 of the hexagon socket head cap screw is according to the provisions of JIS B 1176 or smaller than that according to the provisions of JIS B 1176. Thus, the protrusion height of the upper portion of the head portion 41 of the hexagon socket head cap screw from the flat surface 22d3 of the screw stator 22 is smaller than the protrusion height of the head portion of the standardized product from the flat surface 22d3 of the screw stator 22. That is, in the structure described in the first variation, the head portion 41 of the hexagon socket head cap screw is arranged in the counterbore 22e, and therefore, the protrusion height of the upper surface of the head portion 41 of the hexagon socket head cap screw from the flat surface 22d3 of the screw stator 22 is smaller than that in the typical structure formed with no counterbore 22e. Note that in a case where a fixing bolt 40 having a smaller height of a head portion 41 than that according to the provisions of JIS B 1176 is used as the fixing bolt 40, the dimensions of some portions may be different from those according to the provisions of JIS B 1176. Note that in this case, the depth of the hexagon hole 42 is preferably according to the provisions of JIS B 1176 for ensuring the clamping force of the fixing bolt 40.

Other configurations of the first variation are similar to those of the above-described first embodiment. The same reference numerals are used to represent the same members, and description thereof will not be repeated.

The first variation has such a structure that the upper portion of the head portion 41 of the hexagon socket head cap screw protrudes from the flat surface 22d3 of the screw stator 22. Thus, as compared to the above-described first embodiment, a clearance between the head portion 41 of the hexagon socket head cap screw and the lowermost rotor blade 12 is narrowed by the protrusion of the head portion 41 of the hexagon socket head cap screw from the flat surface 22d3 of the screw stator 22. However, the height of the head portion 41 of the hexagon socket head cap screw is equal to or smaller than that of the standardized product, and therefore, the clearance between the head portion 41 of the hexagon socket head cap screw and the lowermost rotor blade 12 can be more expanded as compared to that in the typical structure. Thus, advantageous effects similar to those of the first embodiment are provided.

Second Variation of First Embodiment

Figure 6:
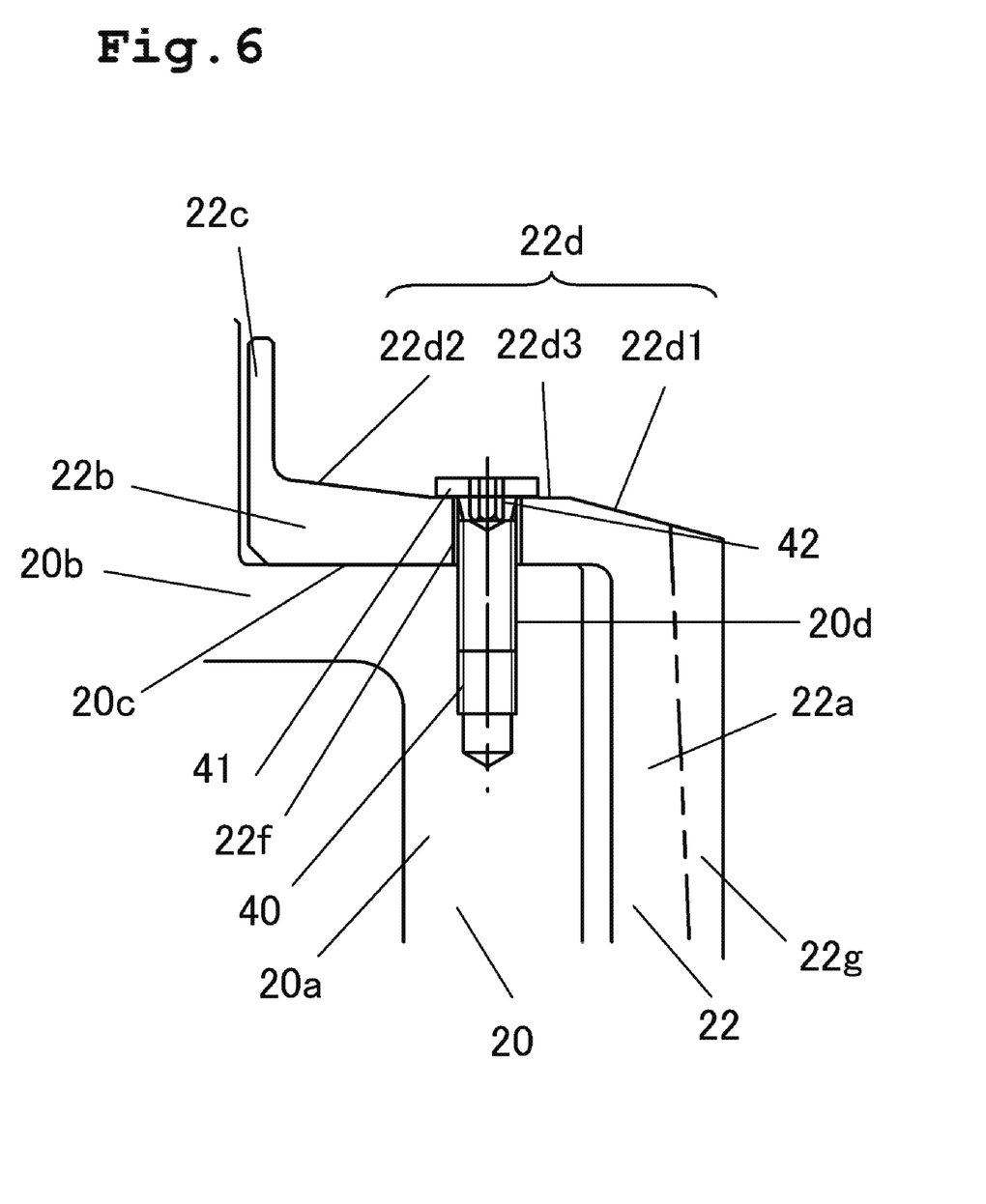
FIG. 6 is a view of a second variation of the first embodiment.

FIG. 6 is a view of a second variation of the first embodiment, FIG. 6 corresponding to FIG. 3.

The second variation illustrated in FIG. 6 has such a structure that the head portion 41 of the hexagon socket head cap screw is fixed in contact with the flat surface 22d3 of the upper surface 22d of the screw stator 22 without the counterbores 22e being provided at the upper surface 22d of the screw stator 22. In the second variation, a hexagon socket head cap screw having a smaller height (a smaller thickness) of a head portion 41 than that of the hexagon socket head cap screw specified according to JIS B 1176 is used as the hexagon socket head cap screw. Note that as long as the head portion height with respect to the outer diameter of the head portion 41 is smaller than that according to the provisions of JIS B 1176, the dimensions of some portions may be different from those according to the provisions of JIS B 1176. Note that in this case, the depth of the hexagon hole 42 is preferably according to the provisions of JIS B 1176 for ensuring the clamping force of the fixing bolt 40.

Other configurations of the second variation are similar to those of the above-described first embodiment. The same reference numerals are used to represent the same members, and description thereof will not be repeated.

In the second variation, the bolt having a smaller head portion height than that of the hexagon socket head cap screw specified according to JIS B 1176 is used in such a structure that the screw stator 22 is fixed to the upper surface 20c of the base 20 with the hexagon socket head cap screws. Thus, as compared to the typical structure using the hexagon socket head cap screws according to the provisions of JIS B 1176, the clearance between the head portion 41 of the hexagon socket head cap screw and the lowermost rotor blade 12 can be more expanded. Thus, advantageous effects similar to those of the first embodiment are provided.

Third Variation of First Embodiment

Figure 7A:
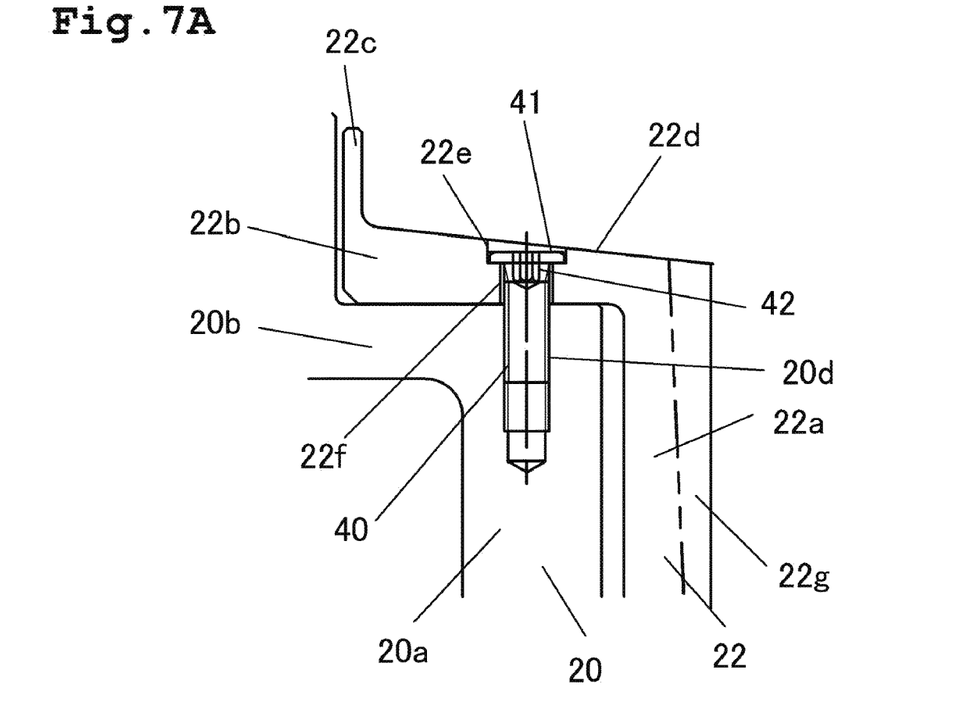
FIGS. 7A and 7B are views of a third variation of the first embodiment.
Figure 7B:
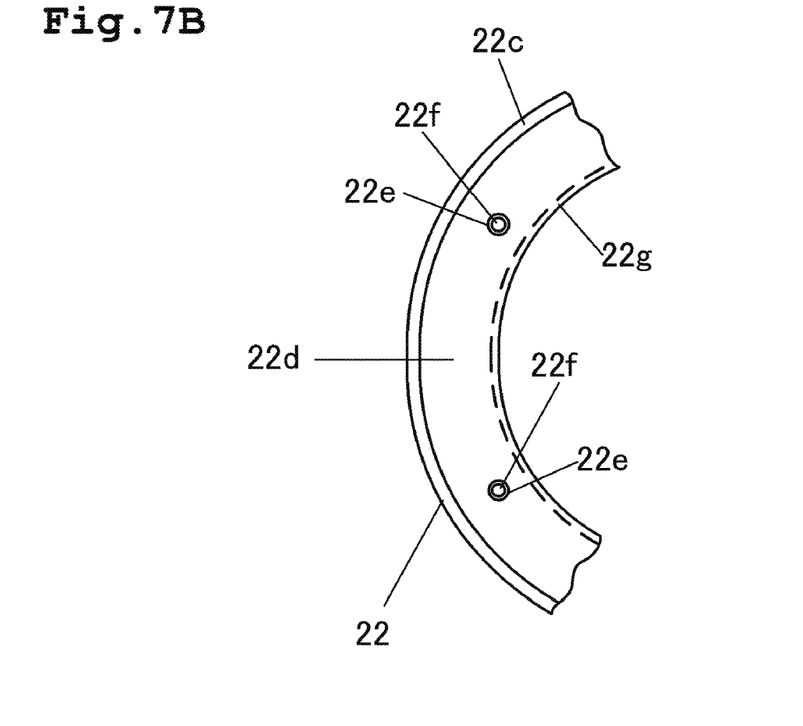

FIGS. 7A and 7B are views of a third variation of the first embodiment, FIGS. 7A and 7B corresponding to FIG. 3.

In the third variation illustrated in FIGS. 7A and 7B, the entirety of the upper surface 22d of the screw stator 22 is an inclined surface with a downward slope toward the rotor shaft 11, and does not have a flat surface perpendicular to the rotor shaft 11. Moreover, the entirety of the head portion 41 of the hexagon socket head cap screw for fixing the screw stator 22 to the upper surface 20c of the base 20 is arranged in the counterbore 22e. That is, the height of the head portion 41 of the hexagon socket head cap screw is smaller than the depth of the counterbore 22e even at an end portion position of the counterbore 22e closest to the rotor shaft side, i.e., at such a position that the depth of the counterbore 22e is smallest. The height of the head portion 41 of the hexagon socket head cap screw is according to JIS B 1176 or smaller than that according to JIS B 1176. In a case where a fixing bolt 40 having a smaller height of a head portion 41 than that according to the provisions of JIS B 1176 is used as the fixing bolt 40, the dimensions of some portions may be different from those according to the provisions of JIS B 1176. Note that in this case, the depth of the hexagon hole 42 is preferably according to the provisions of JIS B 1176 for ensuring the clamping force of the fixing bolt 40.

Other configurations of the third variation are similar to those of the above-described first embodiment. The same reference numerals are used to represent the same members, and description thereof will not be repeated.

In the third variation, in the structure in which the screw stator 22 is fixed to the upper surface 20c of the base 20 with the hexagon socket head cap screws in the guiding path of the screw groove exhaust portion SP into which gas is guided from the turbo exhaust portion TP, the counterbores 22e are provided at the upper surface 22d of the screw stator 22 to which the gas is guided from the turbo exhaust portion TP, and the upper surface of the head portion 41 of each hexagon socket head cap screw is formed lower than the upper surface 22d of the screw stator 22. Thus, the clearance between the upper surface 22d of the screw stator 22 and the lowermost rotor blade 12 is not narrowed by a portion of the head portion 41 of each hexagon socket head cap screw. Thus, advantageous effects similar to those of the first embodiment are also provided in the third variation.

Note that in the third variation, the entirety of the upper surface 22d of the screw stator 22 is formed as the inclined surface, and it is not necessary to form an annular flat surface in the middle of the inclined surface. Thus, a cost can be reduced with favorable productivity of the screw stator 22.

Second Embodiment

Figure 8:
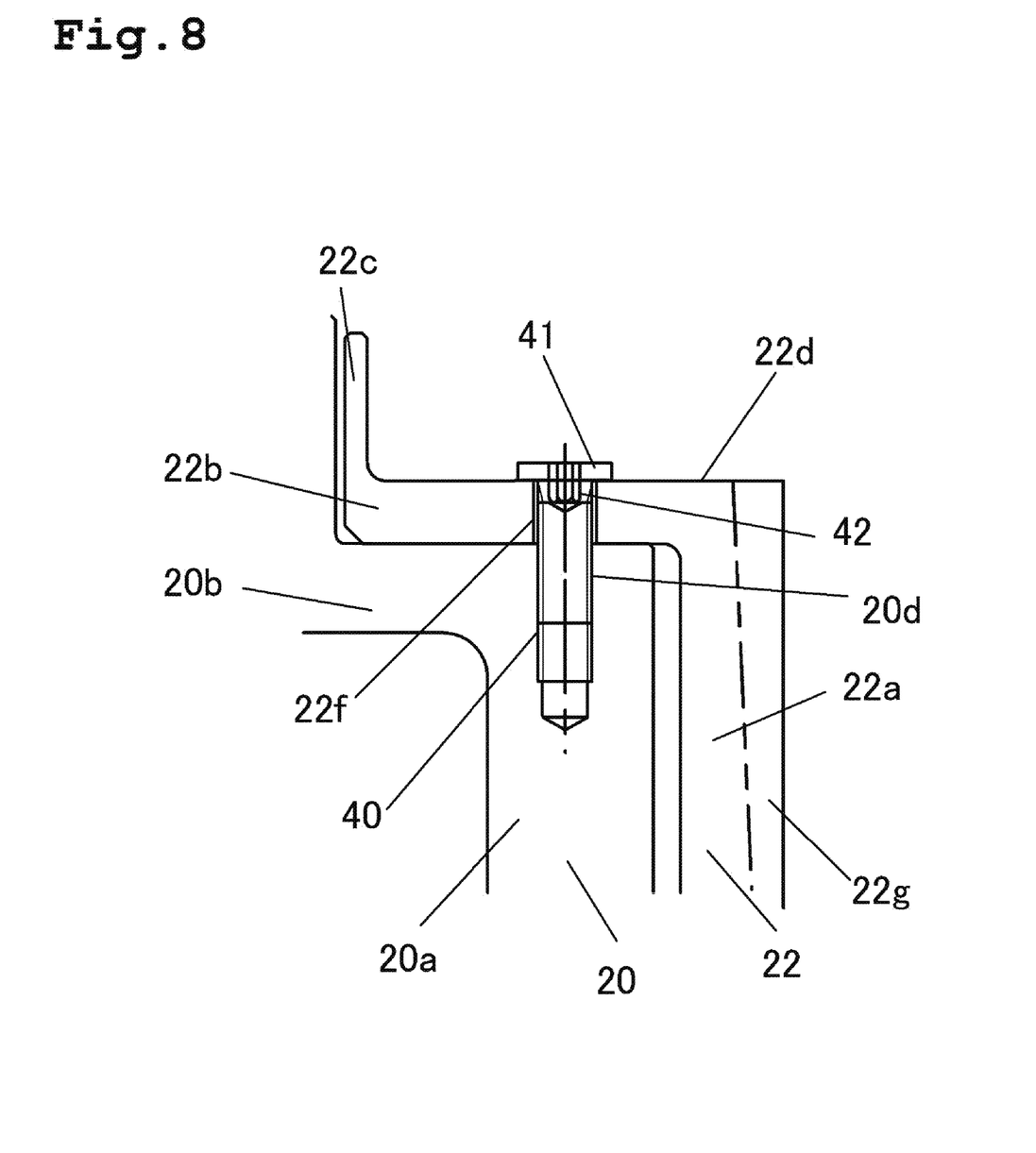
FIG. 8 is a view of a second embodiment of the present invention.

FIG. 8 is a view of a second embodiment of the present invention, FIG. 8 corresponding to FIG. 3.

In the second embodiment illustrated in FIG. 8, the entirety of an upper surface 22d of a screw stator 22 is a flat surface arranged in a direction substantially perpendicular to a rotor shaft 11, and does not have an inclined surface with a downward slope toward the rotor shaft 11. Moreover, each hexagon socket head cap screw as a fixing bolt 40 for fixing the screw stator 22 to a base 20 is, at a lower surface of a head portion 41 thereof, fixed onto the upper surface 22d of the screw stator 22.

A hexagon socket head cap screw having a smaller height (a smaller thickness) of a head portion 41 than that according to the provisions of JIS B 1176 is used as the hexagon socket head cap screw. Note that as long as the head portion height with respect to the outer diameter of the head portion 41 is smaller than that according to the provisions of JIS B 1176, the dimensions of some portions may be different from those according to the provisions of JIS B 1176. Note that in this case, the depth of a hexagon hole 42 is preferably according to the provisions of JIS B 1176 for ensuring clamping force of the fixing bolt 40.

Other configurations of the second embodiment are similar to those of the above-described first embodiment. The same reference numerals are used to represent the same members, and description thereof will not be repeated.

In the second embodiment, the bolt having a smaller head portion height than that of the hexagon socket head cap screw specified according to JIS B 1176 is used in such a structure that the screw stator 22 is fixed to an upper surface 20c of the base 20 with the hexagon socket head cap screws. Thus, as compared to a typical structure using hexagon socket head cap screws according to the provisions of JIS B 1176, a clearance between the head portion 41 of the hexagon socket head cap screw and a lowermost rotor blade 12 can be more expanded. Thus, advantageous effects similar to those of the first embodiment are provided.

Note that in the second embodiment, the entirety of the upper surface 22d of a flange 22b of the screw stator 22 is the flat surface, and therefore, a cost can be more reduced with favorable productivity of the screw stator 22 as compared to the first embodiment.

Third Embodiment

Figure 9:
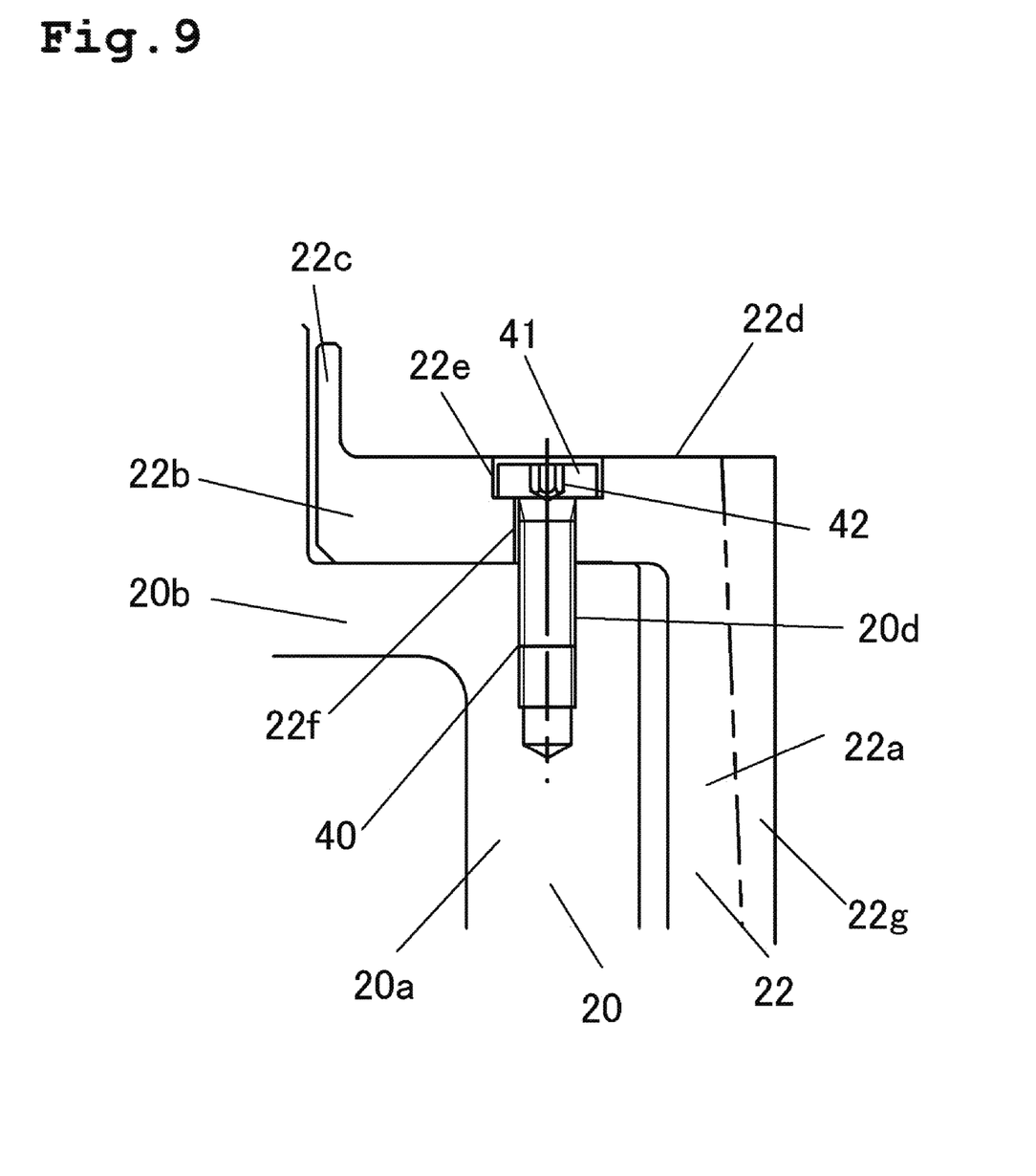
FIG. 9 is a view of a third embodiment of the present invention.

FIG. 9 is a view of a third embodiment of the present invention, FIG. 9 corresponding to FIG. 3.

The third embodiment is different from the second embodiment illustrated in FIG. 8 in that counterbores 22e are provided at a screw stator 22 and a head portion 41 of each fixing bolt 40 is arranged in the counterbore 22e. The third embodiment describes, by way of example, such a structure that the height of the head portion 41 of the hexagon socket head cap screw is formed smaller than the depth of the counterbore 22e and the entirety of the head portion 41 of the hexagon socket head cap screw is arranged in the counterbore 22e. Thus, an upper surface of the head portion 41 of the hexagon socket head cap screw is arranged at a position lower than an upper surface 22d of the screw stator 22.

The hexagon socket head cap screw is a hexagon socket head cap screw (a standardized product) according to the provisions of JIS B 1176 or a hexagon socket head cap screw having a smaller height (a smaller thickness) of a head portion 41 than that of the standardized product. Note that in the case of using, as the fixing bolt 40, a bolt having a smaller height of a head portion 41 than that according to the provisions of JIS B 1176, the dimensions of some portions may be different from those according to the provisions of JIS B 1176. Note that in this case, the depth of a hexagon hole 42 is preferably according to the provisions of JIS B 1176 for ensuring clamping force of the fixing bolt 40.

Other configurations of the third embodiment are similar to those of the above-described second embodiment. The same reference numerals are used to represent the same members, and description thereof will not be repeated.

In the third embodiment, the upper surface of the head portion 41 of the fixing bolt 40 is arranged at the position lower than the upper surface 22d of the screw stator 22, and a clearance between the upper surface 22d of the screw stator 22 and a lowermost rotor blade 12 is not narrowed by a portion of the head portion 41 of the fixing bolt 40. Thus, advantageous effects similar to those of the first embodiment are provided.

Fourth Embodiment

Figure 10:
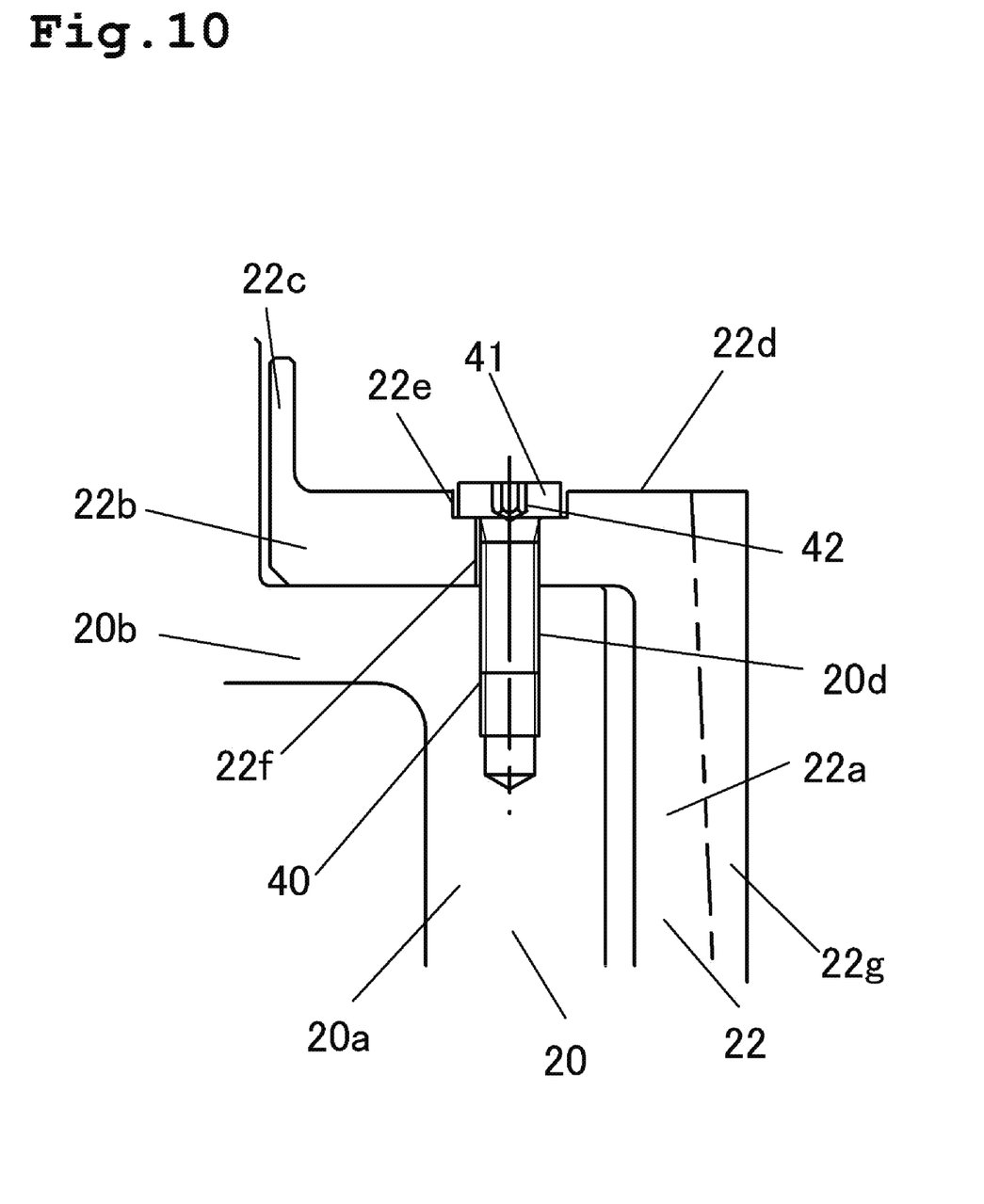
FIG. 10 is a view of a fourth embodiment of the present invention.

FIG. 10 is a view of a fourth embodiment of the present invention, FIG. 10 corresponding to FIG. 3.

The fourth embodiment illustrated in FIG. 10 is different from a third embodiment in such a structure that an upper portion of a head portion 41 of a hexagon socket head cap screw as a fixing bolt 40 protrudes from an upper surface 22d of a screw stator 22.

That is, in this structure, the height (thickness) of the head portion 41 of the hexagon socket head cap screw is formed greater than the depth of a counterbore 22e provided at the screw stator 22. The height of the head portion 41 of the hexagon socket head cap screw is according to the provisions of JIS B 1176 or smaller than that according to the provisions of JIS B 1176. Thus, the protrusion height of the upper portion of the head portion 41 of the hexagon socket head cap screw from the upper surface 22d of the screw stator 22 is smaller than the protrusion height of a head portion of a standardized product from an upper surface 22d of a screw stator 22.

That is, in the structure described in the fourth embodiment, the head portion 41 of the hexagon socket head cap screw is arranged in the counterbore 22e, and therefore, the protrusion height of the upper surface of the head portion 41 of the hexagon socket head cap screw from the upper surface 22d of the screw stator 22 is smaller than that in a typical structure with no counterbore 22e. Note that in a case where a fixing bolt 40 having a smaller height of a head portion 41 than that according to the provisions of JIS B 1176 is used as the fixing bolt 40, the dimensions of some portions may be different from those according to the provisions of JIS B 1176. Note that in this case, the depth of a hexagon hole 42 is preferably according to the provisions of JIS B 1176 for ensuring clamping force of the fixing bolt 40.

Other configurations of the fourth embodiment are similar to those of the above-described second and third embodiments. The same reference numerals are used to represent the same members, and description thereof will not be repeated.

The fourth embodiment has such a structure that the upper portion of the head portion 41 of the hexagon socket head cap screw protrudes from the upper surface 22d of the screw stator 22. Thus, as compared to the above-described third embodiment, a clearance between the head portion 41 of the hexagon socket head cap screw and a lowermost rotor blade 12 is narrowed by the protrusion of the head portion 41 of the hexagon socket head cap screw from the upper surface 22d of the screw stator 22. However, the height of the head portion 41 of the hexagon socket head cap screw is equal to or smaller than that of the standardized product, and therefore, the clearance between the head portion 41 of the hexagon socket head cap screw and the lowermost rotor blade 12 can be more expanded as compared to that in the typical structure. Thus, advantageous effects similar to those of the first embodiment are provided.

Note that in each embodiment described above, the fixing bolt 40 according to Japanese Industrial Standards (JIS) except for the height of the head portion 41 has been described as the fixing bolt 40. However, the fixing bolt 40 may be, except for the height of the head portion 41, according to standards in countries of use (including countries of production and sale) and international organizations, such as ISO standards (International Organization for Standardization), ANISI standards (America), GB standards (China), KS standards (Korea), and DIN standards (Germany).

The above-described embodiments may be used alone or in combination. This is because the advantageous effects of each embodiment can be provided independently or synergistically. The present invention is not limited to the above-described embodiments as long as the features of the present invention are not impaired.

What is claimed is:

1. A vacuum pump comprising:
    a base;
    a rotor shaft rotatably provided at the base;
    a rotor
        including rotor blades arranged in multiple stages and a rotor cylindrical portion, and
        attached to the rotor shaft;
    stationary blades each arranged between adjacent ones of the rotor blades, the stationary blades and the rotor blades forming a turbo exhaust portion;
    a stator forming, together with the rotor cylindrical portion, a screw groove exhaust portion; and
    a hexagon socket head cap screw configured to fix the stator to an upper surface of the base in a guiding path of the screw groove exhaust portion to which gas is guided from the turbo exhaust portion,
    wherein an inner peripheral side inwardly-inclined surface, an inner peripheral side outwardly-inclined surface, and a flat surface arranged between the inner peripheral side inwardly-inclined surface and the inner peripheral side outwardly-inclined surface are formed at an upper surface of a flange of the stator,
    the inner peripheral side inwardly-inclined surface and the inner peripheral side outwardly-inclined surface are formed with a downward slope toward the rotor shaft side,
    the flat surface is annularly formed in a direction perpendicular to the rotor shaft,
    a counterbore is provided at an upper surface of the flat surface of the stator,
    at least part of a head portion of the hexagon socket head cap screw is arranged in the counterbore, and
    an upper surface of the head portion of the hexagon socket head cap screw becomes substantially flush with the upper surface of the flat surface of the stator so that the head portion of the hexagon socket head cap screw does not interfere with a flow of gas, and product accumulation on the outer peripheral surface of the head portion of the hexagon socket head cap screw can be prevented.

* * * * *